(12) United States Patent
Kirchmann et al.

(10) Patent No.: US 12,458,944 B2
(45) Date of Patent: Nov. 4, 2025

(54) DEVICE AND METHOD FOR EXAMINING REACTIONS

(71) Applicant: hte GmbH the high throughput experimentation company, Heidelberg (DE)

(72) Inventors: Marius Kirchmann, Heidelberg (DE); Christoph Hauber, Heidelberg (DE); Edgar Jordan, Heidelberg (DE); Kurt-Erich Finger, Heidelberg (DE); Markus Friess, Heidelberg (DE); Oliver Koechel, Heidelberg (DE)

(73) Assignee: hte GmbH the high throughput experimentation company, Heidelberg (DE)

( * ) Notice: Subject to any disclaimer, the term of this patent is extended or adjusted under 35 U.S.C. 154(b) by 1073 days.

(21) Appl. No.: 17/286,320

(22) PCT Filed: Oct. 15, 2019

(86) PCT No.: PCT/EP2019/077871
§ 371 (c)(1),
(2) Date: Apr. 16, 2021

(87) PCT Pub. No.: WO2020/078952
PCT Pub. Date: Apr. 23, 2020

(65) Prior Publication Data
US 2021/0379553 A1    Dec. 9, 2021

(30) Foreign Application Priority Data
Oct. 17, 2018 (EP) .................................... 18201023

(51) Int. Cl.
*B01J 19/00* (2006.01)
*G01N 1/14* (2006.01)
*G01N 1/24* (2006.01)

(52) U.S. Cl.
CPC ............ *B01J 19/0046* (2013.01); *G01N 1/14* (2013.01); *G01N 1/24* (2013.01);
(Continued)

(58) Field of Classification Search
CPC ............ B01J 19/0046; B01J 2219/0029; B01J 2219/00306; B01J 2219/00418;
(Continued)

(56) References Cited

U.S. PATENT DOCUMENTS 3,485,105 A    12/1969  Johnson et al.
4,116,067 A    9/1978   Pankratz
(Continued)

FOREIGN PATENT DOCUMENTS

CN    1877288 A    12/2006
CN    1942484 A    4/2007
(Continued)

OTHER PUBLICATIONS

Johannes A Lercher et al. "In situ IR spectroscopy for developing catalysts and catalytic processes", Vibrational Spectroscopy., vol. 19, No. 1, Feb. 1, 1999, pp. 107-121.
(Continued)

*Primary Examiner* — John McGuirk
(74) *Attorney, Agent, or Firm* — Element IP, PLC

(57) ABSTRACT

The invention relates to an apparatus for analyzing reactions, comprising at least one reactor (1) and at least two sample vessels (13), wherein, in the case of an apparatus having one reactor (1), the reactor (1) is connected to at least two sample vessels (13), and, in the case of an apparatus having more than one reactor (1), each reactor (1) is connected to at least one sample vessel (13). The invention further relates to a method of analyzing reactions in such an apparatus.

13 Claims, 5 Drawing Sheets

Figure 1:
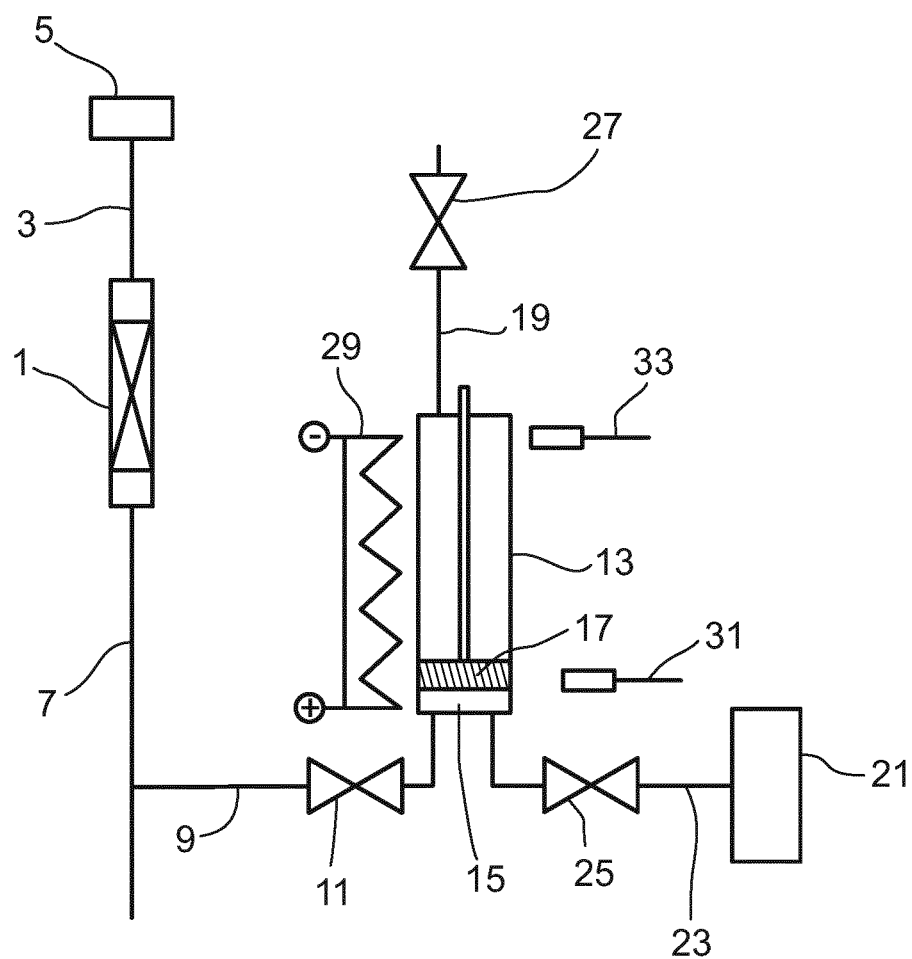

(52) U.S. Cl.
CPC ............... *B01J 2219/0029* (2013.01); *B01J 2219/00306* (2013.01); *B01J 2219/00418* (2013.01); *B01J 2219/00495* (2013.01); *B01J 2219/00707* (2013.01); *B01J 2219/00747* (2013.01); *G01N 2001/1427* (2013.01); *G01N 2001/247* (2013.01)

(58) Field of Classification Search
CPC .... B01J 2219/00495; B01J 2219/00707; B01J 2219/00747; B01J 2219/00286; B01J 2219/00587; B01J 2219/00702; G01N 1/14; G01N 1/24; G01N 2001/1427; G01N 2001/247; G01N 1/10; G01N 1/2226
See application file for complete search history.

(56) References Cited

U.S. PATENT DOCUMENTS

| | | | |
|---|---|---|---|
| 7,997,297 | B2 | 8/2011 | Smit et al. |
| 8,383,050 | B2 | 2/2013 | Haas. et al. |
| 2006/0272432 | A1 | 12/2006 | Belongia |
| 2007/0009384 | A1 | 1/2007 | Klein et al. |
| 2007/0036693 | A1 | 2/2007 | Vandaele |
| 2009/0192340 | A1 | 7/2009 | Culp |
| 2011/0053797 | A1 | 3/2011 | Haas |
| 2012/0316296 | A1 | 12/2012 | Vandaele |
| 2015/0168373 | A1 | 6/2015 | Volker et al. |
| 2016/0025762 | A1 | 1/2016 | Vautz et al. |
| 2017/0342824 | A1* | 11/2017 | Marshall ............... E21B 49/086 |

FOREIGN PATENT DOCUMENTS

| | | | |
|---|---|---|---|
| CN | 102830081 | A | 12/2012 |
| CN | 103123042 | A | 5/2013 |
| CN | 104713994 | A | 6/2015 |
| CN | 204666420 | U | 9/2015 |
| DE | 10157664 | | 6/2003 |
| DE | 102004039378 | | 2/2006 |
| DE | 102014110544 | | 9/2015 |
| JP | 106167487 | | 6/1994 |
| JP | 2001059799 | A | 3/2001 |
| JP | 2007501109 | A | 1/2007 |
| JP | 2007515646 | A | 6/2007 |
| JP | 2008535654 | A | 9/2008 |
| TW | 200938828 | A | 9/2009 |
| WO | WO-9714027 | A2 | 4/1997 |
| WO | 2004104576 | | 12/2004 |
| WO | WO-2006018247 A1 * | | 2/2006 ........... G01N 1/2042 |
| WO | 2008012073 | | 1/2008 |

OTHER PUBLICATIONS

English Translation of First Office Action for Application No. 201980083679.6 dated Jul. 22, 2022, 10 pages.

* cited by examiner

DEVICE AND METHOD FOR EXAMINING REACTIONS

The invention proceeds from an apparatus for analyzing reactions, comprising at least one reactor and a sample vessel for accommodating reaction product to be analyzed. The invention further relates to a method of analyzing reactions in such an apparatus.

In order to test the influence of various parameters, such as pressure, temperature, different composition of the reactant streams or else the efficacy of different catalysts, on a reaction, a large number of experiments is generally required. The problem occurs here that, for comparable results, it is necessary to take samples in a targeted manner over particular periods, especially when it is not possible, for example owing to analyses that take a prolonged period of time, such as chromatographic analyses as to the composition of a reaction mixture, to perform the analyses continuously during the course of the experiment.

An apparatus and a method of analyzing multicomponent mixtures are known, for example, from WO 2008/012073 A1. The apparatus described in WO 2008/012073 A1 has at least two parallel reaction chambers and at least one high-pressure separator and one low-pressure separator for each reaction chamber, wherein the high-pressure separator is connected to the reaction chamber and the low-pressure separator to the high-pressure separator. The high-pressure separator also has an output conduit connected to a unit for analysis.

In order to be able to perform analyses of reaction mixtures, samples are typically taken during the reaction. For this purpose, for example, DE 101 57 664 A1 discloses using a sampling apparatus comprising a cylinder with a piston movable therein. In order to prevent gases deleterious to the reaction from penetrating into the reactor, or gases from escaping from the reactor, the apparatus is connected to the reactor by a valve by means of which the outlet from the reactor can be closed or a connection from the reactor to the sampling apparatus or a connection from the sampling apparatus to an outlet can be opened.

In order to convey an exact fluid volume and hence to ensure comparability of successive measurements, WO 2004/104576 discloses, for alcohol measurement devices, use of a conveying apparatus comprising an electric motor-driven piston-cylinder unit which is connected to a fluid reservoir, and in which the piston has magnetic, electrical and/or electromagnetic properties and can be actuated by means of a coil arranged around the cylinder. In the event of a piston movement in one direction, the conveying device sucks a particular fluid volume from the fluid reservoir into a measurement chamber, and, in the event of movement of the piston in the other direction, expels it again from the measurement chamber.

An apparatus for taking of defined amounts of gas from a gas reservoir and supply to a reservoir vessel is known from U.S. Pat. No. 3,485,105. This apparatus is used particularly for the taking of equal amounts that are collected in the reservoir vessel to detect a representative sample. It is especially possible here that gas reservoir and reservoir vessel have different pressure heads.

A disadvantage of the apparatuses known from the prior art is that the sampling of reactions at comparable times or the analysis of reaction parameters over the course of the reaction, especially of those that cannot be measured continuously but entail the evaluation of a sample over a particular period of time, is possible only with difficulty. It is also difficult to perform serial analyses with the known apparatuses, and to take samples at comparable times.

It is therefore an object of the present invention to provide an apparatus for analyzing reactions, with which it is possible to take samples at comparable times during reactions or to take samples over the course of the reaction, in order also to be able to perform analyses that are not possible online.

This object is achieved by an apparatus for analyzing reactions, comprising at least one reactor and at least two sample vessels, wherein, in the case of an apparatus having one reactor, the reactor is connected to at least two sample vessels, and, in the case of an apparatus having more than one reactor, each reactor is connected to at least one sample vessel.

The connection of a reactor to at least two sample vessels makes it possible to perform analyses irrespective of the time at which the sample was taken. More particularly, it is possible to take samples at defined times and also to perform analyses thereon that take longer than the intervals between two sampling times. In the case of an apparatus having more than one reactor, in which each reactor is connected to at least one sample vessel, it is possible using appropriately switchable valves to take a sample from each reactor at the same time. It is possible here to perform the same reaction in all reactors in order thus also to detect fluctuations in the progression of the reaction, or alternatively to perform a reaction with altered parameters in each reactor, in order to examine the influence of changes in reaction parameters on the reaction in this way. For this purpose too, it is necessary for the sampling to take place at the same time in each case. If time dependence is additionally also to be examined, at least two sample vessels in each case are connected to each reactor even in the apparatus having multiple reactors. The connection of each reactor to at least two sample vessels, preferably to at least four sample vessels, more preferably to at least eight sample vessels and especially to at least sixteen sample vessels makes it possible to take one sample at each given time over the course of the reaction and to analyze these independently of the progression of the reaction. The maximum number of sample vessels is defined by the build space available and the size of the sample vessels. Preferably, the maximum number of sample vessels for each reactor is 100, especially 50. If a larger number of samples is to be taken than sample vessels are connected to the reactor, it is also possible to connect the sample vessels to the reactor in such a way that these can be removed after the sample has been taken during the performance of the reaction, and replaced by a new, empty sample vessel. In the case of fixedly installed sample vessels, it is alternatively possible to connect these to the reactor using a suitable valve that permits transfer of the sample present in the sample vessel to a further vessel after sampling. In this case, for analyses that are each intended to give results at a particular time in the reaction, it is possible to transfer the samples individually to small analysis vessels. If an average over the reaction time is to be detected, the samples captured individually may also be collected in a larger vessel and mixed therein, in which case the analyses are performed on the mixture thus collected.

If controllable valves are used for the connection of the sample vessels to the reactor, it is also possible to take the samples in an automated manner. If the controllable valves have a suitable interface, it is also possible to control sampling online by means of suitable input devices, such as process control systems, computers, smartphones or tablet computers connected to the interface.

In order to prevent the sample vessel from also containing impurities as well as the reaction product to be analyzed that has been taken from the reactor, and in order to facilitate sampling, each sample vessel preferably has an adjustable volume. More preferably, the volume prior to commencement of sampling is zero and increases during the sampling in accordance with the sample taken. It is also possible here to generate a reduced pressure by increasing the volume of the sample vessel, such that reaction gas flows into the sample vessel owing to the reduced pressure generated. In order to be able to adjust the volume of the sample vessel, it is particularly advantageous when the sample vessel comprises a cylinder with a piston movable therein. If reduced pressure is to be generated for sampling, this can be effected in a simple manner by moving the piston. The movement of the piston creates a space in the cylinder into which the sample can flow. If the reaction mixture that is to be taken as sample is at a pressure above the ambient pressure, the piston is preferably pushed out of the cylinder by the incoming reaction mixture, which increases the volume of the sample vessel. Alternatively, it is also possible to apply a reduced pressure to the piston and hence to move the piston owing to the reduced pressure applied and to generate the space into which the sample can flow. In this case, either hydraulic or pneumatic control of the piston is possible. In the case of pneumatic control, it is possible to utilize any desired gas, preference being given to air. Hydraulic control can be achieved, for example, with any desired liquid, especially hydraulic oil or water.

The cylinder that forms the sample vessel may have any desired cross-sectional shape. For example, it is possible to use a cylinder having a circular footprint or a cylinder having an angular footprint, for example a triangular, quadrangular, pentagonal or hexagonal footprint. All other shapes are also possible, but particular preference is given to a cylinder having a circular footprint. The piston movable within the cylinder has a shape corresponding to the footprint of the cylinder, such that the piston adjoins the inner wall of the cylinder when it moves. Preferably, the piston is additionally surrounded by a sealing element, for example an O-ring or a sealing cord which is pressed against the inner wall of the cylinder by the piston, in order to prevent reaction mixture taken as sample from being able to escape through any possible gap between piston and inner wall of the cylinder.

In order to remove possible impurities from the sample vessel, it is advantageous to purge the sample vessel prior to use with a purging agent which is inert to the reaction mixture to be accommodated. For this purpose, for example, it is possible to use gases such as nitrogen or noble gases. The inert purging agent is preferably supplied to the sample vessel via a purge conduit, wherein the purge conduit is either connected directly to the sample vessel or opens into the feed into the sample vessel. When the purge conduit opens into the feed into the sample vessel, preference is given to using a valve into which the feed and the purge conduit open and from which the feed into the sample vessel then branches. Preference is given here to using a controllable valve, such that the purging of the sample vessel can also be automated. If the reaction mixture taken as sample is to be diluted with an inert medium, it is advantageous when the same inert medium is used for purging.

In order to be able to mix the sample taken with an inert medium, the sample vessels are preferably connected to a source for an inert medium. For this purpose, for example, an inert conduit may open into the sample vessel, or a feed into the sample vessel. The source for the inert medium is, for example, a reservoir vessel comprising the inert medium. In the case of a liquid as inert medium, it is possible, for example, to use a liquid tank or any other liquid vessel as source for the inert medium. When the inert medium is a gas, the source for the inert medium is, for example, a suitable gas reservoir, for example a pressure vessel comprising the gas. When the inert medium is used not just to dilute the reaction mixture but also for purging, it is advantageous to supply the inert medium for purging via the same conduit via which it is also supplied for dilution of the reaction mixture. In this case, it is thus unnecessary to provide separate inert conduits and purge conduits.

In order to take an unambiguously defined amount of sample with each sample vessel, it is preferable when, in the case of use of a cylinder with piston movable therein as sample vessel, at least one position sensor with which the position of the piston can be detected is installed on the cylinder. Suitable examples for this purpose are sensors with which the respective final positions of the piston, i.e. the position with an empty sample vessel and the position with a full sample vessel, after taking of the sample are detected. This can be effected, for example, by optical, inductive, mechanical or ultrasound sensors. Alternatively, it is also possible, for example by using a step motor for the movement of the piston, to detect the exact position and hence the exact sample volume at any time in the sampling. A further advantage of the use of a sample vessel with a movable piston is that no additional gas for displacement is required for taking of the sample. In methods with which the sample is displaced from the sample vessel by a gas in order to transport it to an analysis unit, there is the risk that the gas used for displacement will mix with the reaction mixture and hence lead to distorted results. A further advantage is that, in the case of actuation of the piston by means of a suitable drive, for example a step motor, automated withdrawal of the sample for supply to an analysis unit is also possible. When the piston is controlled hydraulically or pneumatically, this can alternatively be accomplished by generating an elevated pressure on the side of the piston remote from the sample, such that the piston is moved in the direction of the sample and forces it out of the sample vessel. This permits, for example, acceptance of a sample into a sample vessel in a fully automated manner, transportation of the sample to the analysis unit and then purging of the sample vessel before acceptance of a further sample.

In order to be able to take samples from a reactor successively at defined times, the reactor preferably has an outlet connected to a multiway valve, and each outlet of the multiway valve is connected to a sample vessel. The use of the multiway valve permits taking of samples in immediate succession and introduction of each sample into a new sample vessel. For this purpose, in each case after conclusion of the taking of a sample, for example after a defined sampling period or a defined sample volume, the multiway valve can be switched further and the feed to a further, still-empty sample vessel can be opened. Alternatively, it is also possible, after taking of a sample, first to close all sample vessels and, at a later defined time, to open the feed into a further, still-empty sample vessel and to take a further sample. In this case too, the sampling is preferably ended after a defined sampling period has elapsed or after a defined sample volume has been taken by closing the corresponding sample vessel. It is preferable in all variants to end the sampling after a defined amount of sample has been taken.

The sample volume is preferably detected here via the position of the piston of the sample vessel. Once the piston has reached a defined position corresponding to the sample volume to be taken, the sampling is ended. In the case of sampling by applying a reduced pressure by pulling the piston out of the cylinder, the sampling can be adjusted either by measurement of the pressure in the sample vessel or else by means of a defined sampling period. Depending on the duration of the reaction and the size of the reactors used, it is possible to use sample vessels of different size. For frequent sampling at short intervals, for example in order to examine the progression of the reaction, preference is given to using smaller sample vessels having a volume in the range from 20 to 1000 ml, preferably in the range from 100 to 500 ml, whereas, in the case of studies of longer reactions in which samples are to be taken continuously over a longer period of time and these are mixed in one sample vessel, or else in the case of larger reactors, sample vessels having a volume of 100 ml to 20 l, preferably 1 to 15 l, can be used.

Especially when multiple reactors are operated in parallel and a sample is to be taken at the same reaction time from each reactor for an analysis, it is advantageous when a switchable valve is accommodated between each reactor and the associated sample vessel, with which the feed into the sample vessel can be controlled. For instance, the use of switchable valves, for example, permits simultaneous opening and closing of all valves, such that a sample is taken at the same time from all reactors. This is advisable especially when the same reaction is being conducted in the reactors and all reactors are connected to a common reactant feed, such that the reaction is also started simultaneously in all reactors. Alternatively, a controllable valve also permits taking of samples at defined times after the reaction has started in a reactor. In this case, the intervals at which samples are to be taken are defined, and the starting point for the measurement of the first interval is, for example, the attainment of a defined process parameter or the commencement of supply of reactant to the corresponding reactor.

When the sample volumes to be taken are larger than the sample vessels, it is also possible to connect multiple sample vessels to one reactor. In this case, a switchable valve is positioned upstream of each sample vessel. For sampling, the switchable valve is opened upstream of a first sample vessel, such that the sample can flow into the sample vessel. As soon as the sample vessel is filled, the switchable valve is closed and the switchable valve of a further sample vessel is opened. This can be repeated until all sample vessels are filled. In addition, it is also possible in this case to take a sample from an already filled sample vessel at this early stage and to analyze it, while further sample vessels are still being filled. In this case, after the sample has been taken from the sample vessel and the sample vessel has possibly been purged, it is again possible to take a new sample.

When samples are to be taken from multiple reactors at different times, it is also possible to connect the same sample vessels to multiple reactors, for example by using a multi-way valve between the reactors and the sample vessels, in which each reactor is connected to an inlet of the multiway valve and the multiway valve has an outlet connected to a conduit from which a connection to each sample vessel branches. The switchable valve is then within each connection to the sample vessels.

As an alternative to the above-described sample vessels with a displaceable piston, it is also possible to use sample vessels that have a defined volume and are evacuated prior to the sampling.

Here too, a switchable valve is positioned upstream of each sample vessel. Owing to the reduced pressure in the sample vessel, a sample is sucked into the sample vessel when the switchable valve is opened. In order to take the sample, it is possible to displace it by means of an inert gas, or disposable cartridges are used as sample vessels, from which the sample can be taken for analysis, or which can alternatively be inserted into a suitable analysis apparatus.

The reactors used in the apparatus for analysis of reactions may either be batch reactors or continuously operated reactors. In batch reactors, it is possible by the use of multiple sample vessels that are filled successively to analyze the progression of the reaction, for example. In continuously operated reactors, by contrast, it is possible through the use of multiple sample vessels that are filled successively to examine whether fluctuations occur in the course of the reaction, or else how long it takes for a steady state to be established.

If the apparatus for analysis of reactions comprises multiple reactors, it is possible to perform the same reaction in all reactors in order in this way to examine fluctuations and differences in the progression of the reaction. Alternatively, the use of multiple reactors also permits variation of individual reaction parameters and hence examination of the influence of the individual reaction parameters on the reaction. Possible reaction parameters that can be varied are, for example, temperature, pressure and, in the case of continuous reactions, the flow rates of the reactants used and the ratio of the individual reactants, and in batchwise reactions correspondingly the amount of the individual reactants used. In addition, it is also possible to use different catalysts and hence to examine the efficacy of different catalysts for a reaction.

In order to obtain comparable analysis results for those analyses in which the reaction parameters are varied or different catalysts are used, it is necessary for the samples from each reaction each to be taken at defined times, and for the sample volumes also to be the same. The samples present in the individual sample vessels may be analyzed after sampling, for example in order to ascertain the conversion or else to detect by-products formed during the reaction. For this purpose, the analysis methods known from chemical analysis may be used, for example, chromatographic methods such as gas chromatography or high-performance liquid chromatography, spectrometric methods such as mass spectroscopy, spectroscopic methods such as infrared spectroscopy and UV/VIS, or else combinations of different methods.

The apparatus is also suitable for calibration of analytical devices since it is possible to produce a homogeneous sample from a variable product mixture from a reactor by collection and thermal equilibration in the sample vessel. The sample can be guided through a combination of different analytical methods, which means that it is possible to use one method having known calibration to calibrate other methods having unknown calibration. For example, it is possible for the same sample to flow through an analytical device with an easily calibrated chromatography method (e.g. gas chromatography) and an analytical device with a spectroscopy method (e.g. IR), in order to obtain calibration for the analytical device having a spectroscopy method, which is subsequently able to monitor the reaction products from a reactor with higher time resolution than the chromatographic method. This can especially be used in the field of chemometrics, in which chemical information can be extracted from experimental measurement data by mathematical and statistical methods, and a corresponding model has to be generated in advance from samples of known composition.

The apparatus is suitable for analysis of reactions that are conducted in the gas phase, for those that are conducted in the liquid phase, and for gas/liquid reactions. The apparatus is particularly suitable for analysis of reactions in the gas phase or gas/liquid reactions, and here especially those in which the reaction product is gaseous and at least one reactant is liquid. When the reaction forms multiple products or only some of the reactants are converted in an equilibrium reaction, it is possible, prior to the sampling, first to undertake separation of the reaction mixture taken from the reactor. It is possible for this purpose, for example, as described in WO 2008/012073 A1, to use a high-pressure separator and a low-pressure separator. The sample vessels may then be connected both to an outlet from the high-pressure separator and to an outlet from the low-pressure separator, in order in this way to examine the different components into which the reaction mixture leaving the reactor is separated in the high-pressure separator and in the low-pressure separator.

Especially when the reaction mixture is taken in gaseous form from the reactor and has a condensation point above the ambient temperature, such that at least some of the reaction mixture condenses on cooling, it is preferable when the sample vessels are heatable. As a result, it is possible to warm up the sample vessels to a temperature above the condensation temperature of the reaction mixture, such that the reaction mixture remains in gaseous form in the sample vessel. This is advantageous especially when the subsequent reactions or analyses are to be performed in the gas phase or when the reaction mixture separates into a gas phase and a liquid phase on cooling, which can lead to incorrect or inaccurate measurement results, especially when the exact composition of the reaction mixture is to be detected. The sample vessels can preferably be heated up to a temperature of up to 100° C., and especially to a temperature of up to 150° C., and heating to higher temperatures is also conceivable in the case of analysis of reactions with correspondingly high-boiling components. The sample vessels are preferably electrically heated, and heating with a heating medium, for example a thermal oil or else steam, is also possible in the case of fixed incorporation of the sample vessels. In the case of non-fixed incorporation, for example when the sample vessels are to be removed after sampling in order to transport them to an analysis unit, it is advantageous to provide electrical heating, which can be maintained with a suitable accumulator during transport. Alternatively, insulation of the sample vessel may also be sufficient for the transport, in which case preference is given here, for simpler handling, to electrical heating by connection and disconnection of an electrical power supply.

The pressure in the sample vessel preferably corresponds to the pressure of the reaction. This is generally in the range from 0 to 10 bar(abs), preferably in the range from 1 to 5 bar(abs). However, it is also possible to establish different pressures in the sample vessel and in the reactor, in which case, preferably, a lower pressure is established in the sample vessel, for example ambient pressure, in the case of a reaction under elevated pressure, and a higher pressure in the sample vessel, for example ambient pressure, in the case of a reaction below ambient pressure.

A method of analyzing reactions in such an apparatus typically comprises the following steps:
(a) performing a reaction in each of the reactors, where all reactions are conducted under the same reaction conditions or where the reaction conditions are varied in each reactor;
(b) taking a sample from each reactor at a given time into the sample vessel, wherein a sample is taken at the given time from each reactor, or pulsed sampling, wherein reaction medium taken from the reactor with each sampling pulse is introduced into a new sample vessel;
(c) analyzing the samples present in the sample vessels.

As already set out above, the operation of the reactors in step (a) differs depending on the properties to be examined. If the intention is to examine fluctuations in a reaction, all reactions are conducted under the same conditions. If the influence of different reaction conditions, for example different amounts of reactant, different temperatures or different pressures or else different catalysts, is to be examined, preference is given to varying the reaction conditions in each reactor. It in this case, fluctuations in the reactions are also to be examined, it is additionally also possible to operate a particular number of the reactors with the same reaction conditions in each case.

The progression of the reaction is examined in step (b) by taking the samples in a pulsed manner, with sampling here at defined intervals. It is also possible here, in each case immediately after sampling into a sample vessel has ended, to commence with sampling into a subsequent sample vessel. Either the sampling time is fixed or a sample is taken in each case until a defined amount of sample is present in the sample vessel. For this purpose, for example, the position of the piston in the sample vessel can be detected.

In the case of sampling until a particular amount of sample is present in the vessel, it is also advantageous when samples are to be taken in parallel from multiple reactors to commence with sampling into a subsequent sample vessel only when the sampling into a sample vessel has ended in all reactors. This ensures that the samples have each been taken at the same time, such that the analysis of the samples taken gives comparable results.

The analysis of the samples in step (c) can be performed with known analytical devices, for example, as already mentioned above, by chromatographic, spectrometric or spectroscopic methods.

In order to examine the reactions, further reaction parameters are preferably also detected as well as the samples taken, the composition of which can be examined. These further reaction parameters include, for example, the pressure and temperature in the reactor.

Depending on the reactions examined and the analyses to be conducted, it is possible to mix the samples taken with an inert medium. The mixing with the inert medium can be effected in the sample vessel. It is alternatively also possible to transfer the sample from the sample vessel to a further vessel and to mix in the inert medium in the further vessel.

Especially in the case of examination of reactions that are performed continuously, it may also be desirable to detect values averaged over the course of the reaction. For this purpose, for example, the samples taken successively from a reactor can be introduced into a further vessel and mixed in that vessel. Using these mixed samples that had been taken successively, it is then possible, for example, to ascertain an average composition of the reaction mixture. The transfer of the reaction mixture taken as the sample into the further vessel then preferably precedes the analysis in step (c). When the same reaction is performed in multiple reactors and averaged values established at defined times are to be detected, it is alternatively also possible to transfer the samples that have been each taken from the individual reactors at the same time into a common vessel and to mix them therein prior to the analysis.

The apparatus of the invention thus makes it possible to perform serial studies and to detect comparable data for each of the reactions conducted or else to precisely analyze a reaction progression.

Illustrative embodiments of the invention are shown in the figures and are elucidated in detail in the following description.

Figure 2:
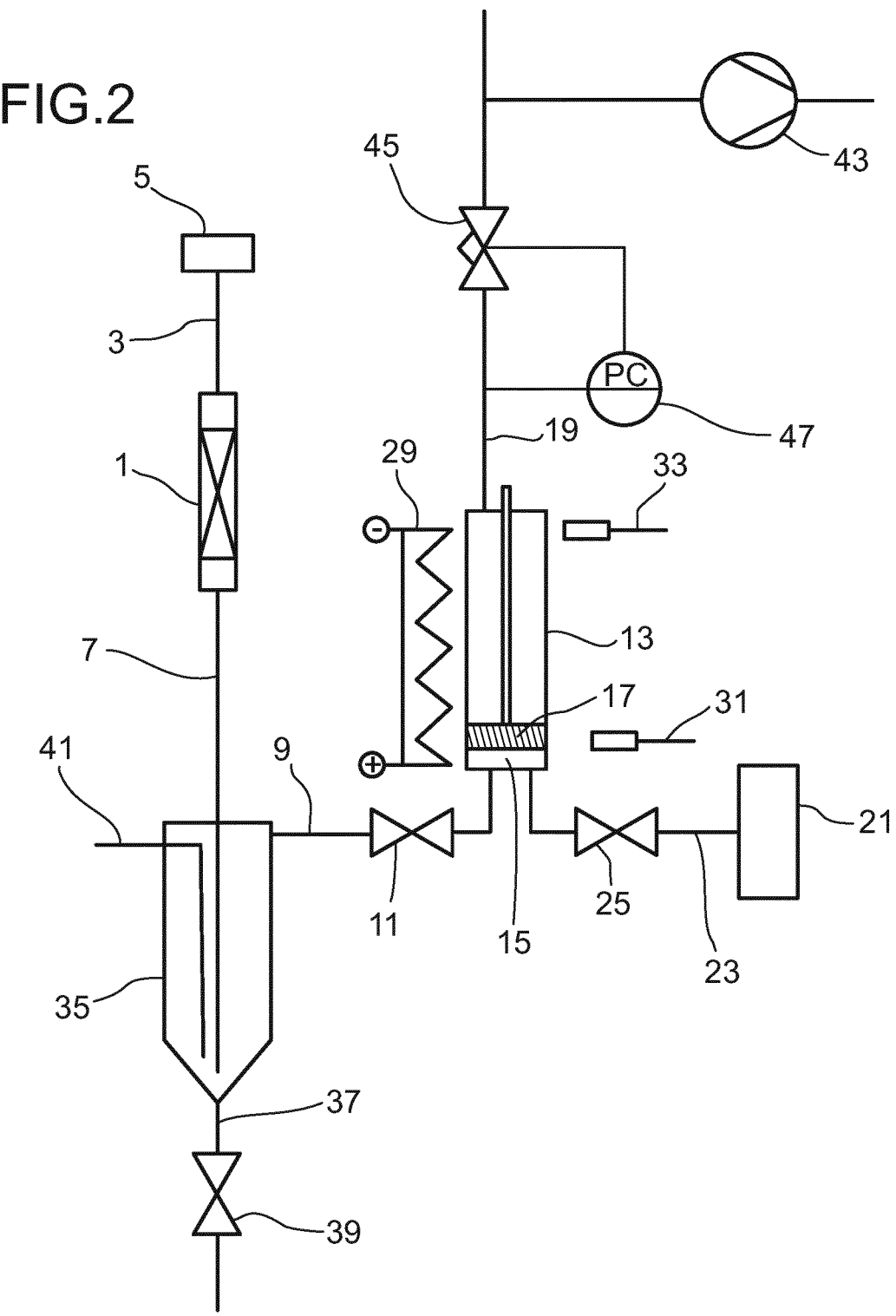
Figure 3:
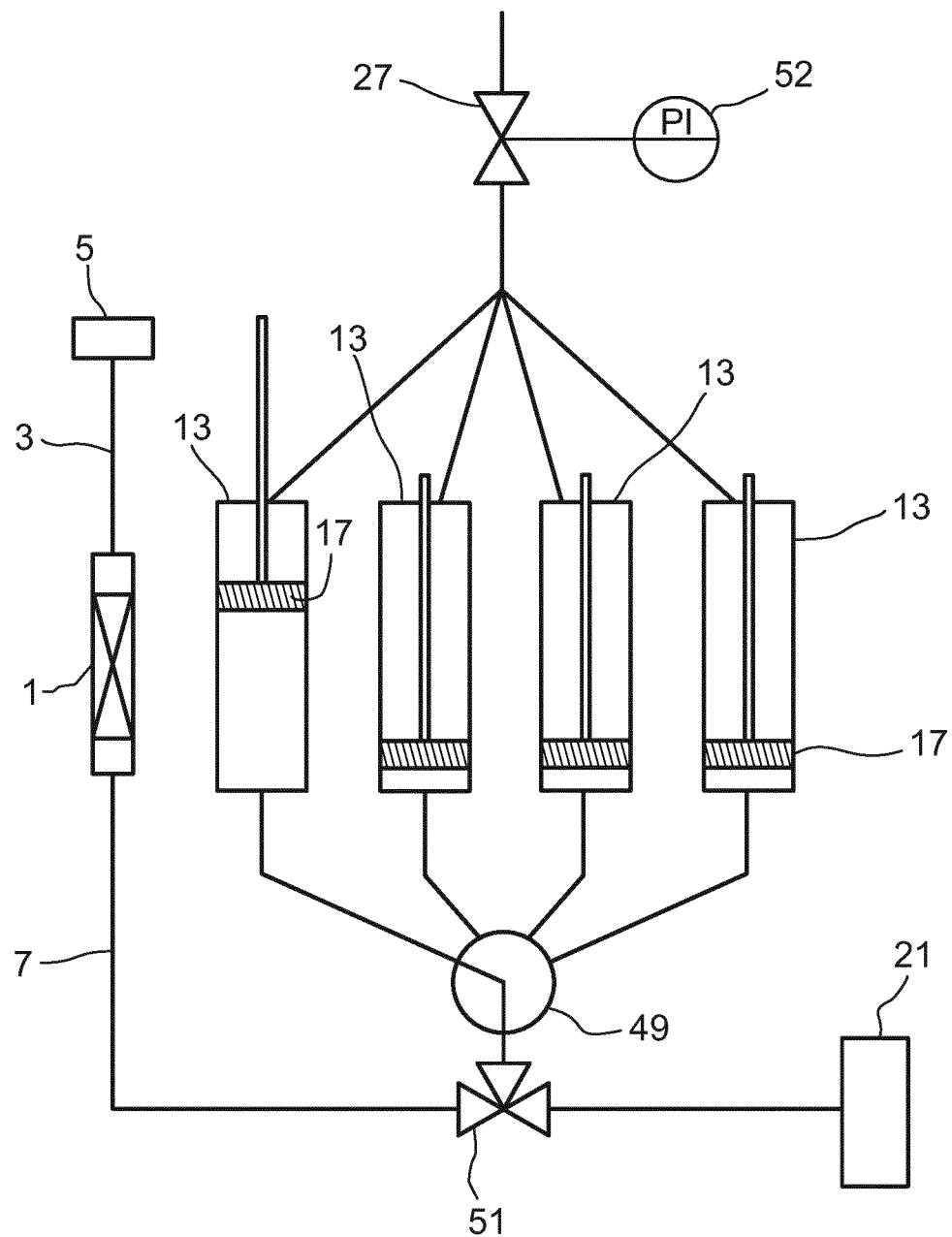
Figure 4:
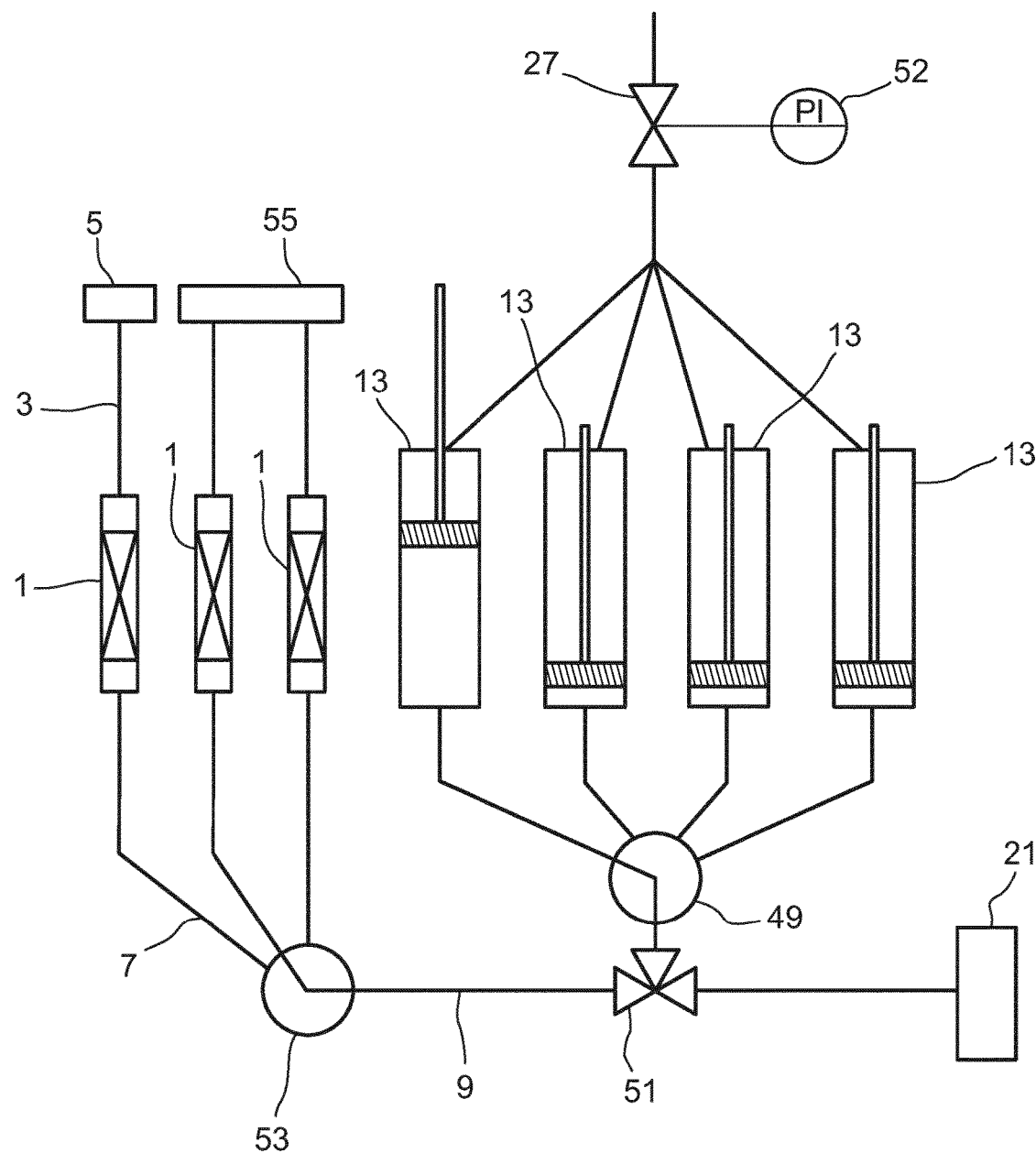
Figure 5:
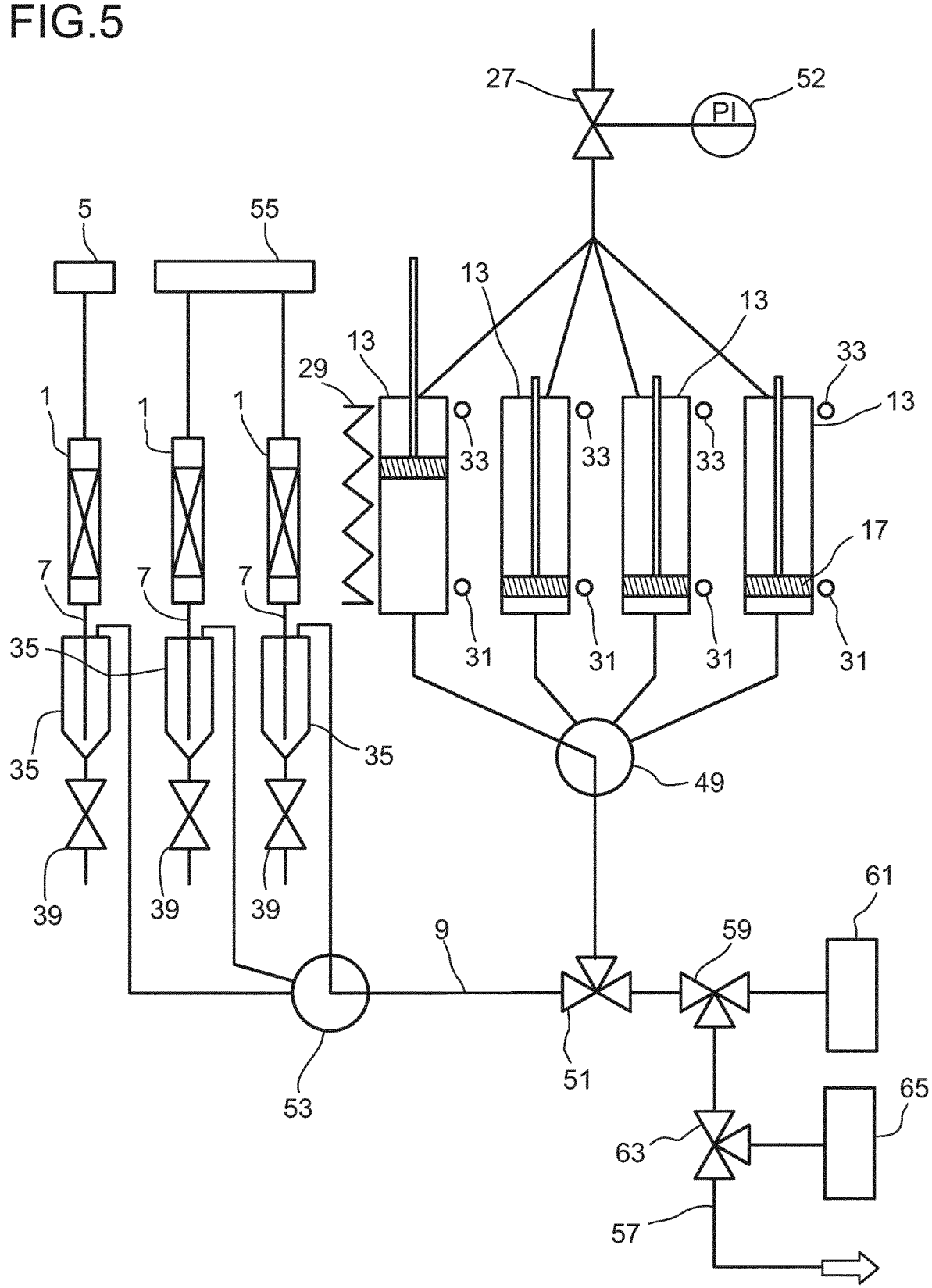

The figures show:

FIG. 1 a section of an apparatus for analysis of reactions, having a reactor and a sample vessel, FIG. 2 an apparatus for analysis of reactions, having a separator, FIG. 3 an apparatus for analysis of reactions, having one reactor and multiple sample vessels, FIG. 4 an apparatus for analysis of reactions, having multiple reactors, FIG. 5 an apparatus for analysis of reactions, having multiple reactors, in a further embodiment.

FIG. 1 shows a section of an apparatus for analysis of reactions, having a reactor and a sample vessel.

For analysis of a reaction, reactants are supplied to a reactor 1 via a feed 3. These are converted to a reaction product in the reactor, with the possibility of complete or partial conversion of the reactants depending on the reaction. In addition, it is also possible to supply the reactor with an inert medium. The reactants may be supplied to the reactor either individually via respectively separate feeds 3 or alternatively, as shown here, mixed in a mixer 5 and then introduced into the reactor via the feed 3.

It is possible to use any desired catalyst suitable for the reaction to be analyzed in reactor 1. When a homogeneous catalyst is used, this is preferably mixed into the reactants. Even if further substances that do not take part in the reaction, for example initiators, are required, these are either introduced directly into the reactor or alternatively already mixed with the reactants prior to introduction into the reactor, for example in the mixer 5.

In the case of a heterogeneously catalyzed reaction, the catalyst is preferably accommodated in the reactor in a fixed manner, for example as a packing or bed. Alternatively, however, it is also possible to use the catalyst in the form of a fluidized bed or moving bed. A moving bed is preferred especially when the catalyst has to be regularly exchanged or regenerated.

An outflow conduit 7 is used to withdraw the reaction mixture generated in the reactor 1 from the reactor. In order to be able to analyze the reaction mixture, samples of the reaction mixture have to be taken. For this purpose, a sample conduit 9 branches off from the outflow conduit 7. This is connected via a first valve 11 to a sample vessel 13. If the intention is to analyze the entire reaction mixture generated in the reactor, it is unnecessary to provide a sample conduit 9 branching off from the outflow conduit 7. In this case, the outflow conduit 7 may be connected directly to the sample vessel 13, in which case the first valve 11 upstream of the feed into the sample vessel 13 is also required in order to be able to stop the flow of the reaction mixture into the sample vessel 13.

In order to take a sample, the first valve 11 is opened. With the first valve 11 open, it is then possible for reaction mixture to flow out of the reactor 3 via the sample conduit 9 into a sample chamber 15 in the sample vessel 13. The sample chamber 15 is preferably bounded, as shown here, on one side by a piston 17 movable within the sample vessel 13. The piston 17 can be used to adjust the volume of the sample chamber 15 in the sample vessel 13. At the start of the sampling, the piston 17 is preferably in a first position in which the volume of the sample chamber 15 is at a minimum. With commencement of sampling, the piston 17 then moves in the direction of a second position in which the volume of the sample chamber 15 is at a maximum. As soon as the piston 17 has reached the second position or if the sampling is to be ended before the piston has reached the second position 17, the valve 11 is closed, such that no further reaction mixture can flow into the sample chamber 15 in the sample vessel 17.

The movement of the piston 17 can be assisted for sampling in that a pressure lower than the pressure of the reaction mixture is applied to the side of the piston 17 remote from the sample chamber 15. This simultaneously leads to suction of reaction mixture into the sample chamber 15. In order to apply the lower pressure to the side of the piston 17 remote from the sample chamber 15, it is possible, for example, for a gas conduit 19 on the side of the piston 17 remote from the sample chamber 15 to open into the sample vessel 13. In order to apply the lower pressure, the gas conduit 19 sucks gas out of the sample vessel, such that the piston 17 moves in the direction of its second position. As soon as the sampling is to be ended, the suction of the gas is ended.

The reaction mixture present in the sample chamber 15 is then sent to an analysis unit 21 in a next step. It is possible here to use any desired analysis unit with which the desired analyses on the gas mixture can be conducted. Customary analysis units are especially those with which the composition of the reaction mixture can be determined. In order to be able to supply the reaction mixture to the analysis unit 21, the analysis unit 21 is connected via a measurement conduit 23 to the sample chamber 15 in the sample vessel 13. In order to be able to close the measurement conduit 23, a second valve 25 is accommodated in the measurement conduit 23. During the sampling, the second valve 25 is closed.

In order to supply the sample to the analysis unit 21, the second valve 25 is opened. Then the piston 17 is moved in the direction of its first position, such that the reaction mixture present in the sample chamber 15 is forced out of the sample chamber 15 into the measurement conduit 23 by the movement of the piston 17 and supplied to the analysis unit 21 through the measurement conduit 23. The piston 17 can be moved either with a suitable drive or, as shown here, with the aid of pressurized gas which flows into the sample vessel via the gas conduit 19 and thus acts on the side of the piston 17 remote from the sample chamber 15. The pressure exerted on the piston 17 by the pressurized gas forces it in the direction of the sample chamber, such that the reaction mixture present in the sample chamber is forced into the measurement conduit 23. As soon as the piston 17 has reached its first position at which the volume of the sample chamber is at a minimum, the supply of pressurized gas is ended. For this purpose, a third valve 27 is preferably provided in the gas conduit 19. The supply of pressurized gas is ended by closing the third valve 27.

After the sample chamber 15 has been emptied completely, another sample can then be taken.

Especially in the case of a hot reaction mixture, it is advantageous when the sample vessel is heatable. For this purpose, preference is given to using an electrical heater 29. The electrical heating can be implemented, for example, by means of heating coils surrounding the sample vessel 13. Alternatively, it is also possible to use a heating jacket.

For control of the movement of the piston 17, position sensors are preferably provided. A first position sensor 31 detects whether the piston 17 is in the first position, and a second position sensor 33 whether the piston 17 is in the second position. The position sensors 31, 33 are especially utilized in order to control the movement of the piston by application of reduced pressure or elevated pressure. If a sample is taken, the removal of gas to generate a pressure below the pressure of the reaction mixture is ended when the second position sensor 33 detects that the piston 17 has reached its second position. Accordingly, the pressurized gas supply in the removal of the sample from the sample chamber 15 is ended when the first position sensor 31 detects that the piston 17 has reached its first position.

As an alternative to the above-described embodiment with pneumatic movement of the piston 17, it is also possible for the piston to be moved hydraulically. In this case, rather than a gas, a fluid is used, which is sucked out of the sample vessel 13 when the piston 17 is to move into the second position, and forced into the sample vessel 13 in order to move the piston 17 into its first position.

As well as the pneumatically or hydraulically assisted movement of the piston, movement of the piston is alternatively also possible with the aid of a drive, for example with a step motor. When a step motor is used, it is directly also possible to detect the position of the piston, such that the position sensors 31, 33 can be dispensed with in this case. When a drive that does not permit determination of the piston position is used for the piston, however, the use of the position sensors 31, 33 is advantageous in order to end the movement of the piston in the respective direction by stopping the drive as soon as the corresponding position sensor 31, 33 has detected the piston.

FIG. 2 shows an alternative embodiment of a section from an apparatus for analysis of reactions, comprising a reactor and a sample vessel connected to the reactor. By contrast with the embodiment shown in FIG. 1, the reactor 1 here has been provided with a separator 35. In the separator 35, it is possible to separate out liquid formed in the reaction. This is necessary especially when the analysis unit 21 must not be supplied with any gas. For this purpose, the outflow conduit 7 from the reactor opens into the separator 35, such that the reaction mixture from the reactor 1 is supplied to the separator 35 through the outflow conduit 7. Liquid is then separated out of the reaction mixture in the separator and withdrawn via a withdrawal conduit 37. The withdrawal conduit 37 can be closed by a fourth valve 39, such that the separator 35 can in each case be emptied at desired or defined times. This is possible, for example, at defined time intervals or on attainment of a defined liquid level. In addition, it is also possible to supply the liquid separated out in the separator 35 to an analysis unit in order to quantitatively and/or qualitatively analyze the liquid separated out, especially to determine the components present in the liquid and optionally also the quantity of the individual components present in the liquid.

In addition, it is possible to conduct an inert gas conduit 41 into the separator. By means of the inert gas conduit, it is possible to dilute the reaction mixture. This may be necessary, for example, when the concentration of individual components would otherwise be too high for the analysis. Alternatively, it is also possible to use the gas supplied via the inert gas conduit 41 to drive out gas still present in the liquid that collects in the separator. This is necessary, for example, for quantitative analysis of the reaction mixture. In order still to be able to drive gas out of the liquid, the inert gas conduit 41 preferably opens into the liquid collected in the separator 35 as an immersed tube. In order to ensure this, liquid is preferably removed in that case only to such a degree as to attain a minimum liquid level that is still sufficiently high for the inert gas conduit 41 to be immersed in the liquid. Suitable inert gases that are supplied via the inert gas conduit 41 are, for example, nitrogen or noble gases, preferably nitrogen.

At a position above the maximum liquid level, the sample conduit 9 branches off from the separator 35, through which gaseous reaction mixture can be introduced into the sample vessel 13. Sampling is effected in the same way as described above for FIG. 1.

In order to facilitate sampling from the separator 35, a vacuum pump 43 is provided. The vacuum pump 43 can be used to apply a pressure lower than the pressure in the separator to the side of the piston 17 differing from the sample chamber 15. As a result, with the first valve 11 open, gaseous reaction mixture is sucked out of the separator 35 into the sample chamber 15. The vacuum pump 43 is especially advantageous when the reaction is performed under ambient pressure or a pressure below ambient pressure. When the reaction is performed at a pressure above ambient pressure, in general, one outlet to the environment is sufficient, since, in this case, the positive pressure of the reaction mixture forces the reaction mixture into the sample chamber 15 and moves the piston 17 upward. In order to prevent the piston from being forced upward too quickly, it is possible in this case either to provide the piston with a weight or preferably to insert a valve in the outlet to the environment that can be opened only to such an extent that the piston is raised at the desired speed. A construction as shown in FIG. 1 is sufficient for this purpose.

Alternatively, it is also possible to dispense with the pump 43 and to generate the positive pressure needed in the separator 35 by the supply of the inert gas through the inert gas conduit 41. In order that the reaction mixture can be withdrawn from the sample chamber 15, as described above, a positive pressure is then applied to the opposite side of the piston 17 from the sample chamber 15, such that the piston 17 is forced in the direction of the sample chamber 15 and hence the mixture present in the sample chamber 15 is guided out of the sample chamber 15 through the measurement conduit 23 to the analysis unit 21.

For control of the piston 17, in the embodiment shown in FIG. 2, a controllable valve 45 is accommodated in the gas conduit 19. For this purpose, the pressure is measured in the gas conduit 19 between the sample vessel 13 and the controllable valve 45, and the valve is controlled with a pressure regulator 47. When the pressure measured in the gas conduit 19 differs from the desired pressure, the controllable valve 45 is set correspondingly. The controllable valve 45 is opened further if too low a pressure is measured, and closed further if too high a pressure is measured. If too low a pressure is measured, during the sampling, the piston 17 is moved too quickly into its second position and the volume of the sample chamber 15 is increased; when the piston 17 is moved into its first position, the piston 17 is moved too slowly and the reaction mixture present in the sample chamber 15 is guided too slowly from the sample chamber 15 into the analysis unit 21. If too high a pressure is measured, during the sampling, the piston 17 is moved too slowly, such that the sampling is not fast enough, or the pressure that acts on the piston 17 is even so high that it does not move and hence no sample is taken. When the piston 17 is moved into its first position, the effect of an excessively high pressure is excessively rapid movement in the first position, such that the reaction mixture is displaced too quickly from the sample chamber 15.

In order to analyze the progression of the reaction over a longer period, multiple sample vessels are connected to the reactor, which can each successively accommodate a sample. This is shown by way of example for a reactor in FIG. 3.

In order to be able to successively take multiple samples from the reactor, the reactor is connected via a multiway valve 49 to multiple sample vessels 13. There is additionally a 3-way valve 51 between the reactor and the multiway valve 49. The 3-way valve 51 is utilized either to establish a connection from the reactor 1 to the sample vessels 13 or alternatively from the sample vessels 13 to the analysis unit 21. In order to be able to take a sample, the 3-way valve 51 is adjusted such that a connection from the reactor 1 to the multiway valve 49 is open, and the connection from the multiway valve 49 to the analysis unit 21 is closed. The multiway valve 49 is then used to open the connection to the respective sample vessel 13 that is to be filled during the sampling. Accordingly, for the analysis of the samples present in the sample vessels 13, the 3-way valve 51 is connected such that the connection from the 3-way valve 51 to the analysis unit 21 is open and, by the multiway valve 49, the connection to the sample vessel 13 from which the desired sample is to be taken and guided to the analysis unit 21.

With the multiway valve 49, it is possible in a simple manner to successively take multiple samples by, after sampling into a sample vessel 13 has ended, switching over the multiway valve 49 and opening the connection to the next sample vessel 13. This can be repeated until samples are present in all sample vessels 13. Accordingly, it is then also possible to supply the samples from the individual sample vessels 13 successively to the analysis unit 21 by, in the course of sampling too, switching over the multiway valve 49 to a further sample vessel 13 as soon as a sample vessel 13 has been emptied. In order to assist the movement of the pistons 17 in the sample vessels, each sample vessel 13 is connected to a gas conduit 19 here too, such that—as described above for FIGS. 1 and 2—the movement of the piston 17 can be assisted by application of pressure on the side remote from the sample chamber 15 or by application of a reduced pressure on the side remote from the sample chamber 15. In this case, it is possible to simultaneously exert the pressure on all pistons or simultaneously to apply reduced pressure to all pistons 17, since only in the sample vessel 13 to which the connection through the multiway valve 49 is open is it possible to move the piston 17 for accommodation of a sample or for emptying. In the other sample vessels, owing to the closed connection, a pressure equilibrium is established, which prevents the movement of the piston.

Here too, the third valve 27 is accommodated in the gas conduit 19 through which the gas is guided to assist the piston movement. The valve may be equipped with a pressure gauge 52 in order thus to have control over whether a sample vessel 13 is currently being filled or emptied. In the case of a pressure below the reactor pressure, a sample vessel 13 is being filled, and, in the case of a pressure above the reactor pressure, the sample from a sample vessel 13 is being supplied to the analysis unit 21.

FIG. 4 shows a further embodiment of an apparatus for analysis of reactions.

The embodiment shown in FIG. 4 differs from that shown in FIG. 3 by the connection of multiple reactors 1 to the sample vessels 13. In order to connect the reactors 1 to the sample vessels, a second multiway valve 53 is included, via which the reactors 1 are connected to the 3-way valve 51. In the embodiment shown here, a sample can be taken from one reactor 1 in each case. For this purpose, the second multiway valve 53 is connected such that a connection from the reactor 1 from which the sample is to be taken to the 3-way valve 51 is open. The connection from the other reactors 1 to the 3-way valve 51 is closed. By virtue of the multiway valve 49, it is then possible to take multiple samples successively. Alternatively, it is also possible to take just one sample from each reactor. In this case, after the taking of a sample, both multiway valves 49, 53 are switched in order to open the connection from a further reactor 1 to a further sample vessel 13. This can be repeated until samples have been taken from all reactors and all sample chambers 15 comprise a sample.

After the sampling, the samples can be supplied to the analysis unit 21. This is effected as described above for FIG. 3. By the construction shown here, it is only possible to take one sample or to guide one sample from a sample vessel 13 to the analysis unit 21. It is not possible simultaneously to take a sample from a reactor and to supply a sample already taken from another sample vessel 13 to the analysis unit 21.

In order to perform the same reaction in multiple reactors, it is advantageous to connect all reactors that are to be supplied with the same reactant composition to a common mixer 55. Reactors that are to be supplied with a different reactant composition are connected to a different mixer 5. If a different composition is to be examined in each reactor, it is necessary to connect each reactor 1 to a separate mixer 5.

Alternatively, in all embodiments, it is of course also possible to introduce the reactants directly into the reactors 1 and to dispense with the upstream mixers 5, 55. It is also possible for the mixing to be effected in the feed 3 in that the individual reactants are introduced into the feed 3 via a suitable connection site.

In addition, it is possible to configure the apparatus such that multiple reactors are provided, each connected to multiple sample vessels. In this case, the second multiway valve 53 is not required since each reactor has its own group of sample vessels.

FIG. 5 shows an apparatus for analysis of reactions in a further embodiment. By contrast with FIG. 4, in the embodiment shown in FIG. 5, the reactors 1 are each connected to a separator 35. The construction of reactor and separator corresponds to that shown in FIG. 2. The sampling is effected as described above for FIG. 4.

Unlike the embodiments described above for FIGS. 1 to 4, the analysis region comprises multiple analysis units 21. For this purpose, multiple 3-way valves 59, 63 are accommodated in the measurement conduit 23. It is possible either for each 3-way valve 59, 63 to be used to open a connection to an analysis unit 61, 65 or for a connection to be opened to a downstream 3-way valve or an outlet 57. For example, it is possible first to switch the first 3-way valve 59 such that reaction mixture is supplied to the first analysis unit 61. Subsequently, the first 3-way valve 59 is switched such that the reaction mixture is guided past the first analysis unit 61 to the second 3-way valve 63. The second 3-way valve 63 is then switched such that the reaction mixture is guided into the second analysis unit 65. If no sample is to be taken, both 3-way valves 59, 63 are switched such that the reaction mixture goes to the outlet 57. It is also possible here to guide a sample only to one analysis unit 61, 65 in each case, the analysis unit 61, 65 utilized being dependent on the analysis to be conducted. In addition, it is also possible, especially in the case of longer-lasting analyses, to supply a sample to the first analysis unit 61 and, while the sample is still being analyzed, a further sample from another sample vessel to the second analysis unit 65. If the analyses take a very long time, it is also possible for acceleration of the analyses to use further analysis units that can each be operated in parallel.

LIST OF REFERENCE NUMERALS 1 reactor
3 feed
5 mixer
7 outflow conduit
9 sample conduit
11 first valve
13 sample vessel
15 sample chamber
17 piston
19 gas conduit
21 analysis unit
23 measurement conduit
25 second valve
27 third valve
29 heater
31 first position sensor
33 second position sensor
35 separator
37 withdrawal conduit
39 fourth valve
41 inert gas conduit
43 pump
45 controllable valve
47 pressure regulator
49 multiway valve
51 3-way valve
52 pressure gauge
53 second multiway valve
55 common mixer
57 outlet

The invention claimed is:

1. An apparatus for analyzing reactions, comprising multiple reactors, wherein each reactor is connected to at least two sample vessels assigned only to that reactor, wherein each sample vessel has an adjustable volume, and wherein each reactor comprises an outlet connected to a multiway valve, and each outlet of the multiway valve is connected to a sample vessel.

2. The apparatus according to claim 1, wherein each sample vessel comprises a cylinder with a piston movable therein.

3. The apparatus according to claim 2, wherein a sensor capable of detecting a position of the movable piston is mounted on each sample vessel.

4. The apparatus according to claim 1, wherein a switchable valve by which the feed into each of the sample vessels can be controlled is accommodated between each of the reactors and each of the sample vessels connected to the respective reactor.

5. The apparatus according to claim 1, wherein reaction media can flow continuously through each of the reactors.

6. The apparatus according to claim 1, wherein each of the sample vessels is heatable.

7. The apparatus according to claim 1, wherein the sample vessels are connected to a source of an inert medium.

8. A method of analyzing reactions in an apparatus according to claim 1, comprising:
(a) performing a reaction in each of the reactors, where all reactions are conducted under the same reaction conditions or where the reaction conditions are varied in each reactor;
(b) taking a sample from each reactor at a given time into a sample vessel of the at least two sample vessels assigned to each reactor, wherein a sample is taken at the given time from each reactor, or wherein pulsed sampling is performed, wherein reaction medium taken from the reactor with each sampling pulse is introduced into a new sample vessel of the at least two sample vessels assigned to each reactor; and
(c) analyzing the samples present in the sample vessels.

9. The method according to claim 8, wherein pressure and/or temperature is detected during the reaction in each reactor.

10. The method according to claim 8, wherein the sample taken from one of the reactors is mixed with an inert medium in the respective sample vessel.

11. The method according to claim 8, wherein samples taken successively from one of the reactors, before being analyzed in step (c), are transferred from the respective sample vessel to a further vessel, and a mixture of samples taken at various times that is produced in the further vessel is analyzed.

12. The method according to claim 8, wherein the analysis of the sample is performed by means of an analytical method from the group of chromatographic, spectrometric and spectroscopic methods or a combination thereof.

13. The method according to claim 8, wherein the mixture of samples taken at different times is used to generate models of chemometric methods.

* * * * *